June 17, 1947. J. E. P. BURGE 2,422,336
ELECTRICAL DISTRIBUTION SYSTEM
Filed March 1, 1946
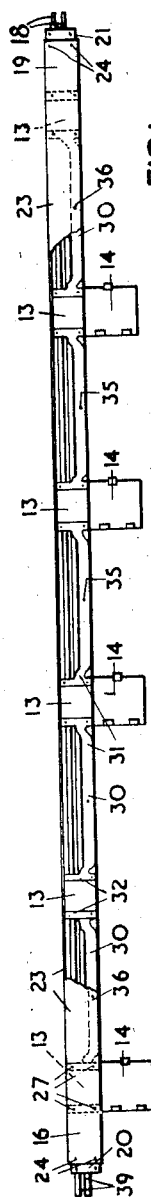
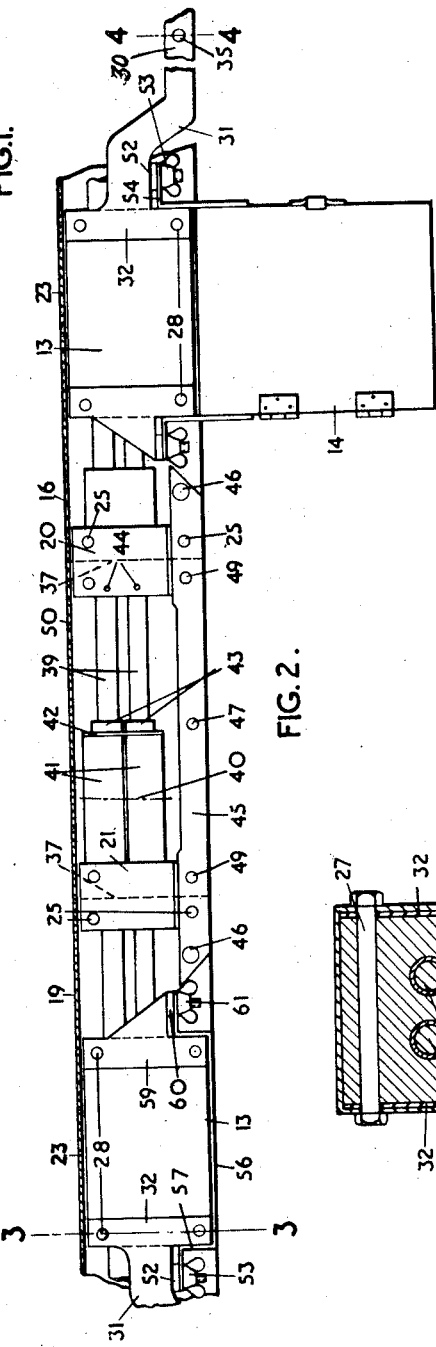
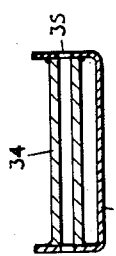
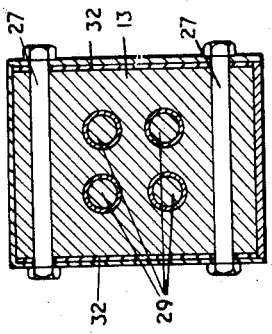
Inventor
John E. P. Burge
by Mawhinney & Mawhinney
Attorneys Patented June 17, 1947

2,422,336

UNITED STATES PATENT OFFICE 2,422,336

ELECTRICAL DISTRIBUTION SYSTEM

John Ernest Percival Burge, Coventry, England, assignor to Humber Limited, Stokes, Coventry, England Application March 1, 1946, Serial No. 651,140
In Great Britain May 7, 1945

4 Claims. (Cl. 173—334.1)

This invention relates to a system of electrical distribution, for a production shop or the like, of the kind including busbars held in spaced relation from one another by insulating blocks which are spaced from one another along the busbars and are mechanically connected to a metal framework, the system being built up of similar sections of a convenient length, for example, 12' each, joined to one another. Such an arrangement is disclosed in patent specification No. 2,069,575.

The invention further relates to such a system of the kind in which the insulating blocks contain sockets connected with the busbars, so that fuse-containing supply boxes can be plugged into the sockets and held in position by bolts or the like detachable means in order to connect an out-going cable with the busbars just where required. Such an arrangement is also disclosed in patent specification No. 2,069,575.

According to application Serial No. 651,139, filed March 1, 1946, an electrical distribution system has four busbars, for three live phases and an insulated neutral, and the fuse-containing boxes have detachable fuses to be in circuit with terminals for the three live phases.

Although not limited in this respect the present invention particularly relates to a sectionalized distribution system when of the four-busbar kind last-mentioned.

The main object of the invention is to provide a very compact and light construction which will be all enclosed and which will have relatively-few detachable parts.

According to the invention, the metal framework of each separate section includes an inverted U-sectioned casing with the lower openings, between the socket-carrying blocks, substantially closed by plates extending between the blocks, and the plates carry screws or other means for the detachable support of fuse-containing supply boxes in co-operation with the blocks.

The term "busbar" is used herein to include not merely a rigid aluminium or copper bar, but also a stranded or other relatively-flexible conductor encased in flexible insulating material, which latter conductor (if expansion takes place due, for example, to an excessive overload being carried by it for a relatively-long time) can flex slightly between adjacent insulating blocks, where it is firmly held.

In the accompanying drawings:

Figure 1 is an elevation, with part of the U-shaped casing shown in section, of a 12' section of an electric distribution system according to the invention;

Figure 2 is an elevation to a larger scale, with the U-shaped casings again in section, of the adjacent ends of two 12' sections of the system and the joint between the two; and Figures 3 and 4 are cross-sections, to a still larger scale, taken on the lines 3—3 and 4—4 respectively, of Figure 2.

Figure 1 of the drawing shows a 12' section with six socket-carrying blocks 13, 13 spaced from one another at intervals of two feet and, for purposes of illustration, fuse-containing supply boxes 14 are shown as being plugged-in to four of the blocks. One end 16 of the section has the ends 17 of the busbars extending from it to a greater extent than the ends 18 of the busbars extend from the other end 19. At each end, 16, 19, is an insulating block 20, 21, respectively, to which the U-sectioned casing 23 is secured by bolts 24 (Figure 1) engaged with bolt holes 25 (Figure 2). The blocks 13 are in like manner connected to the U-sectioned casing 23 by means of bolts 27 passed through bolt holes 28.

As shown by Figure 3, there are four busbars 29 arranged in the form of a rectangle, three carrying live phases and the fourth being an insulated neutral.

Between each block 13 in a section is a closing plate 30 extending between adjacent blocks 13, this plate being, as shown particularly by Figure 4, of flat channel section. Towards its ends it is raised, as indicated at 31, and it is formed at its extremity with side cheeks 32 which are clamped against the adjacent blocks 13 by the through bolts 27 when the whole is assembled. Midway between its ends each cover plate has welded to it a strengthening tube 34 (Figures 2 and 4), the ends of which are aligned with holes 35 in the channel flanges of the cover plate to receive through bolts 36 (Figure 1) which additionally secure the U-shaped casing 23 to the cover plates.

In Figure 2 the ends of each main section are marked 16 and 19 corresponding to the marking employed in Figure 1, and 37, 37 represents the adjacent ends of the two main casings 23. It will be observed that the busbar ends 17 are encased in insulating tubes 39. The joint between the busbar ends is indicated in Figure 2 by the chain-line 40, it being assumed that the busbar ends are co-planar. The busbar ends are bared to receive clamping means, not shown, and each clamping means is surrounded by an insulating tube 41 engaged at one end by an insulating plate 42, and at the other end by the block 21 in the manner disclosed in application Serial No. 651,141, filed March 1, 1946. The tubes 41 may be formed integrally as a moulding. They are axially located upon the insulating tubes 39 as shown by means of rubber rings 43.

Recesses are provided in the block 20 into which the insulating tubes 39 can be slid when grub screws 44, locating them with respect to the block 20, have been released, when it is desired to break the joint, and after the insulating tubes 41 have been slid back fully the clamps can be slid axially clear of the shorter-extending busbar ends 18. When the same operation has been carried out at the other end of a section the section can be removed as a whole.

The joint is completed by a tie bar cover plate 45 which is in general similar to the cover plate 30—except that it is of less length and it carries three reinforcing tubes (like tube 34 of Figure 4) through which through bolts can be passed to connect it to the different casings. Thus, at each end there is a bolt hole 46 where a reinforcing tube is and where it can be connected to the adjacent ends 16 and 19 of the main casings, and it has, additionally, holes 25 at which it can be secured to the main casings by the bolts 24. Centrally it has a tube-reinforced hole 47, and elsewhere other holes 49, at which it can be bolted to the inverted U-sectioned joint casing 50.

In the present instance, each of the main cover plates 30 carries a bracket 52 beneath its upwardly-extending portion 31, and the bracket has a pair of screw-threaded downwardly-extending pins which can receive wing nuts 53 by which the flanges 54 of the fuse-containing supply boxes 14 can be supported in a detachable manner. When no fuse box 14 is required at any plugging point 13, it is removed and the open ends of the sockets in the block 13 in question are closed in, as shown at the left of Figure 2, by an insulating cover plate 56 formed with flanges 57 similar to those of the fuse boxes and adapted to be clamped by means of the same wing nuts 53. The two end socket-carrying blocks 13 of each section are connected with only one main cover plate 30. Consequently, at the other end of each of these end blocks 13 there is provided, on each side, a fish-plate 59 to be retained by the means by which the cheeks 32 at the one end are retained. Each fish-plate 59 carries a bracket 60 similar to the bracket 52, the bracket 60 also having a pair of downwardly-extending screw-threaded pins to receive wing nuts 61.

What I claim as my invention and desire to secure by Letters Patent of the United States is:

1. For an electrical distribution system which includes a plurality of sections connected together, a section comprising a plurality of busbars, a plurality of insulating blocks supporting said busbars in laterally-spaced relationship, said insulating blocks being spaced from one another along the busbars, a metal framework which includes a plurality of bottom plates, each of which extends between two adjacent insulating blocks, and an inverted U-sectioned casing with the lower openings thereof, between said insulating blocks, substantially closed by said bottom plates, a mechanical connection between said insulating blocks and said framework so as to provide a rigid structure, a plurality of electrically conductive sockets, in each insulating block, respectively connected to said busbars, raised end portions to each bottom plate, and downwardly-extending pins on said raised portions, the said pins on the adjacent ends of any two contiguous bottom plates being adapted to pass through holes in side flanges of a fuse-containing supply box for enabling the latter to be detachably supported with the conductive plugs of the said box held entered into the respective sockets in the intervening insulating block.

2. A section, according to claim 1, in combination with an insulating cover plate for the sockets of each insulating block which is not intended, at any particular time, to support a fuse-containing supply box, the said pins serving also for enabling each cover plate to be held so as to close the sockets of the appropriate insulating block.

3. A section, for an electrical distribution system which includes a plurality of sections connected together, comprising a plurality of busbars, a plurality of insulating blocks supporting said busbars in laterally-spaced relationship, said insulating blocks being spaced from one another along the busbars, a metal framework which includes a plurality of bottom plates, each of which extends between two adjacent insulating blocks, and an inverted U-sectioned casing with the lower openings thereof, between said insulating blocks, substantially closed by said bottom plates, a mechanical connection between said insulating blocks and said framework so as to provide a rigid structure, a fish-plate secured to each side of each of the two said insulating blocks which are at the ends of the section, a bracket supported by the pair of fish-plates secured to each of said end blocks, and means carried by each of said brackets for the attachment of a bottom plate for mechanically connecting the said section to an adjacent section.

4. A section, for an electrical distribution system which includes a plurality of sections connected together, comprising a plurality of busbars, a plurality of insulating blocks supporting said busbars in laterally-spaced relationship, said insulating blocks being spaced from one another along the busbars, a metal framework which includes a plurality of channel-sectioned bottom plates, each of which extends between two adjacent insulating blocks, and an inverted U-sectioned casing with the lower openings thereof, between said insulating blocks, substantially closed by said bottom plates, the side flanges of said casing straddling said bottom plates, bracing tubes extending between the side flanges of said bottom plates in alignment with holes therein, a mechanical connection between said insulating blocks and said bottom plates, a mechanical connection between said casing and said insulating blocks, bolts passing through the side flanges of said casing and through said bracing tubes for holding said casing firmly to said bottom plates, a plurality of electrically conductive sockets in each insulating block, an electrical connection between each said socket and a respective busbar, and means for detachably supporting a fuse-containing supply box to any two adjacent said bottom plates so that conductive plugs of the said box can be held entered into respective said sockets in the intervening insulating block.

JOHN ERNEST PERCIVAL BURGE.

REFERENCES CITED

The following references are of record in the file of this patent:

UNITED STATES PATENTS

| Number | Name | Date |
| --- | --- | --- |
| 2,043,796 | Frank | June 9, 1936 |
| 2,407,142 | Cole | Sept. 3, 1946 |
| 1,995,855 | Lee | Mar. 26, 1935 |